(12) United States Patent
Kang

(10) Patent No.: US 11,294,587 B2
(45) Date of Patent: Apr. 5, 2022

(54) DATA STORAGE DEVICE CAPABLE OF MAINTAINING CONTINUITY OF LOGICAL ADDRESSES MAPPED TO CONSECUTIVE PHYSICAL ADDRESSES, ELECTRONIC DEVICE INCLUDING THE SAME, AND METHOD OF OPERATING THE DATA STORAGE DEVICE

(71) Applicant: SK hynix Inc., Icheon (KR)

(72) Inventor: Hye Mi Kang, Seongnam (KR)

(73) Assignee: SK hynix Inc., Icheon (KR)

( * ) Notice: Subject to any disclaimer, the term of this patent is extended or adjusted under 35 U.S.C. 154(b) by 95 days.

(21) Appl. No.: 16/659,292

(22) Filed: Oct. 21, 2019

(65) Prior Publication Data
US 2020/0341636 A1    Oct. 29, 2020

(30) Foreign Application Priority Data
Apr. 26, 2019    (KR) .......................... 10-2019-0049185

(51) Int. Cl.
G06F 3/06    (2006.01)

(52) U.S. Cl.
CPC ............ *G06F 3/064* (2013.01); *G06F 3/0604* (2013.01); *G06F 3/0659* (2013.01); *G06F 3/0665* (2013.01); *G06F 3/0679* (2013.01)

(58) Field of Classification Search
CPC ...... G06F 3/064; G06F 3/0604; G06F 3/0659; G06F 3/0665; G06F 3/0679
See application file for complete search history.

(56) References Cited

U.S. PATENT DOCUMENTS

2019/0265910 A1*   8/2019   Toyooka ................. G06F 3/061
2020/0241799 A1*   7/2020   Kanno .................... G06F 3/064

FOREIGN PATENT DOCUMENTS

| KR | 20160139864 A | 12/2016 |
| KR | 20170120738 A | 11/2017 |

* cited by examiner

*Primary Examiner* — Jane Wei

(57) ABSTRACT

A data storage device includes a memory device and a controller. The memory device includes a rare open block that stores data corresponding to a re-allocated invalid logical address and a normal open block that stores data corresponding to a newly allocated free logical address. The controller determines whether to store write data in the rare open block or the normal open block based on information included in a write command received from a host, and controls the memory device to store the write data in the rare open block or the normal open block according to a result of the determination.

18 Claims, 14 Drawing Sheets

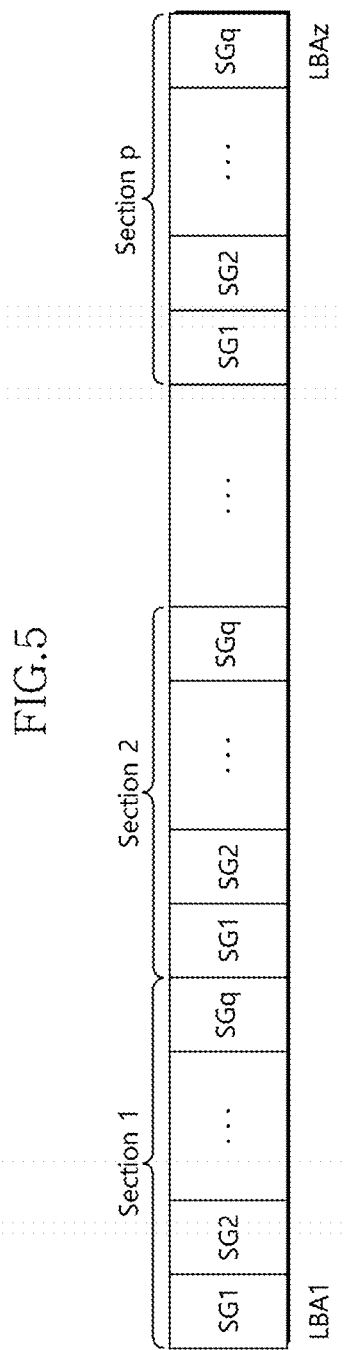

Section 1

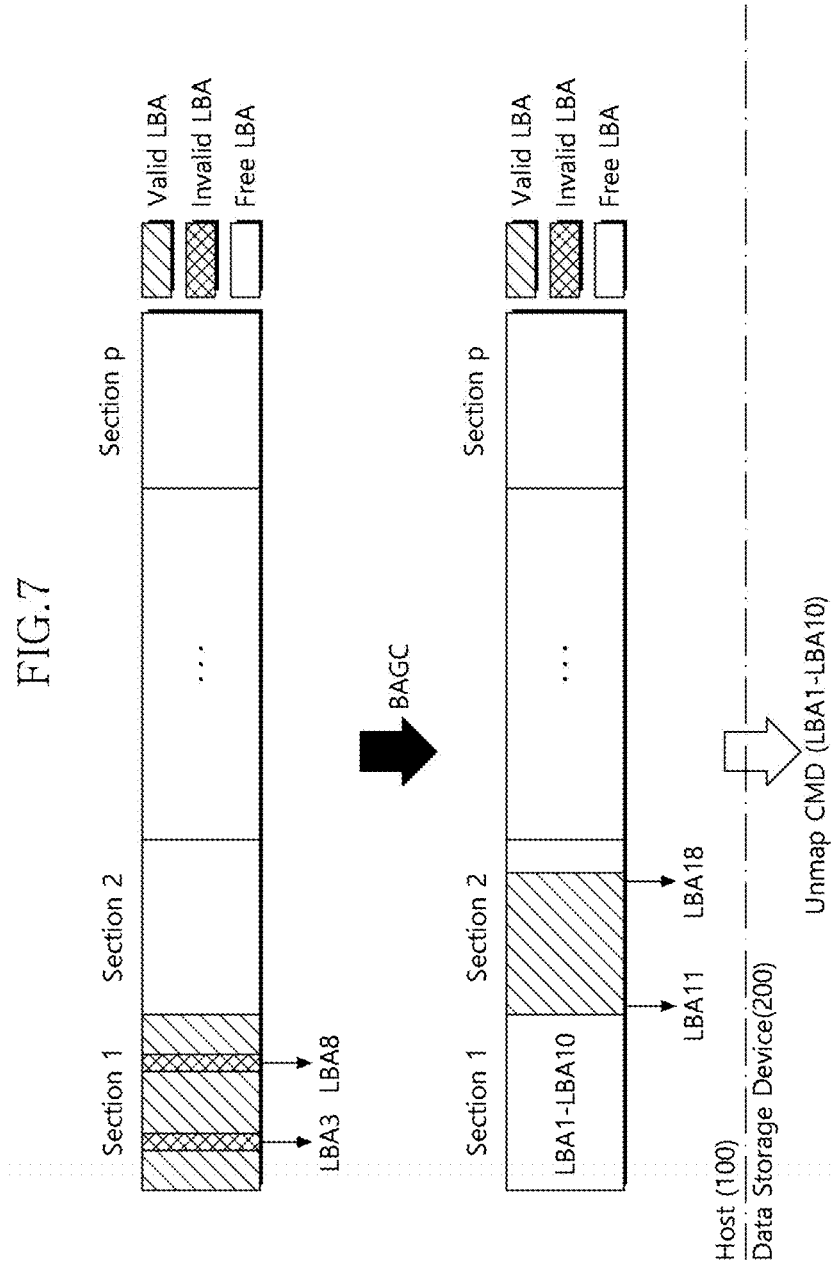

DATA STORAGE DEVICE CAPABLE OF MAINTAINING CONTINUITY OF LOGICAL ADDRESSES MAPPED TO CONSECUTIVE PHYSICAL ADDRESSES, ELECTRONIC DEVICE INCLUDING THE SAME, AND METHOD OF OPERATING THE DATA STORAGE DEVICE

CROSS-REFERENCES TO RELATED APPLICATION

The present application claims priority under 35 U.S.C. § 119(a) to Korean application number 10-2019-0049185, filed on Apr. 26, 2019, in the Korean Intellectual Property Office, which is incorporated herein by reference in its entirety.

BACKGROUND

1. Technical Field

Various embodiments generally relate to an electronic device, and more particularly, to a data storage device, an electronic device including the same, and a method of operating the data storage device.

2. Related Art

Recently, a paradigm for a computer environment has been changed to ubiquitous computing which enables a computer system to be used anytime and everywhere. In the era of ubiquitous computing, the use of portable electronic devices such as cellular phones, digital cameras, and notebook computers is rapidly increasing. Such a portable electronic device generally uses a data storage device using a memory device. The data storage device is used to store data used in the portable electronic device.

The data storage device using the memory device is advantageous in that stability and durability are superior due to the absence of a mechanical driving unit, a data access rate thereof is very fast, and power consumption thereof is low. The data storage device having such advantages includes any of a universal serial bus (USB) memory device, a memory card having diverse interfaces, a universal flash storage (UFS) device, a solid state drive (SSD), and the like.

SUMMARY

A data storage device capable of maintaining the continuity of logical addresses respectively mapped to consecutive physical addresses, an electronic device including the same, and a method of operating the data storage device are described herein.

In an embodiment, a data storage device includes: a memory device including a rare open block that stores data corresponding to a reallocated invalid logical address and a normal open block that stores data corresponding to a newly allocated free logical address; and a controller configured to determine whether to store data in the rare open block or the normal open block based on information included in a write command received from a host, and to control the memory device to store the data in the rare open block or the normal open block according to a result of the determination.

In an embodiment, an electronic device includes a host configured to transmit a write command, a write logical address, and write data to a data storage device. The write command includes information indicating whether the write logical address is a re-allocated invalid logical address or a newly allocated free logical address. The electronic device includes the data storage device configured to allocate a first open block to store the write data when the write logical address is the re-allocated invalid logical address, and a second open block to store the write data when the write logical address is the newly allocated free logical address, among a plurality of memory blocks of the memory device, according to the information included in the write command received from the host.

In an embodiment, a method of operating a data storage device includes: allocating a first open block, which stores data corresponding to a re-allocated invalid logical address, and a second open block, which stores data corresponding to a newly allocated free logical address, among a plurality of memory blocks included in a memory device; determining whether to store write data in the first open block or the second open block based on information included in a write command received from a host; and controlling the memory device to store the write data in the first open block or the second open block according to a result of the determination.

In accordance with the embodiments, it is possible to substantially maintain the continuity of logical addresses respectively mapped to consecutive physical addresses during a write operation, and the read performance of the data storage device can be improved as the continuity of the logical addresses is substantially maintained.

BRIEF DESCRIPTION OF THE DRAWINGS

FIG. 5 illustrates a logical address structure managed by a file system in accordance with an embodiment.

FIG. 7 illustrates a background address garbage collection operation.

DETAILED DESCRIPTION

Hereinafter, preferred embodiments will be described with reference to the accompanying drawings.

Figure 1:
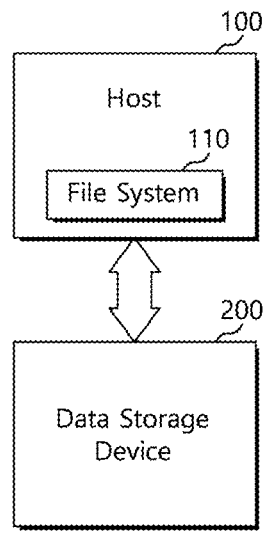
FIG. 1 illustrates an electronic device in accordance with an embodiment.

FIG. 1 illustrates an electronic device 10 in accordance with an embodiment. The electronic device 10 may include a host 100 and a data storage device 200.

The host 100 may be any of a cellular phone, an MP3 player, a laptop computer, a desktop computer, a game machine, a television, an in-vehicle infotainment system, and the like. The host 100 may include a file system 110. Although not illustrated in FIG. 1, the host 100 may include a processing unit (for example, a central processing unit (CPU)) and a driving unit. The processing unit may control the overall operation of the host 100, and the driving unit may drive the data storage device 200 under the control of the processing unit. In an embodiment, the driving unit of the host 100 may include one or more of an application (not illustrated), the file system 110, a host memory (not illustrated), and the like.

The application is also called an application program, and may be software that is executed on an operating system (OS). The application may process data in response to a user's input. For example, the application may process user data in response to a user's input and transfer a command for storing the processed user data in a memory device of the data storage device 200 to the file system 110.

The file system 110 may allocate a logical block address LBA (hereinafter, referred to as a 'logical address') to store the user data in response to the command transferred from the application. In an embodiment, the file system 110 may be a flash-friendly file system (F2FS) or another kind of file system made similar to the F2FS, but embodiments are not limited thereto.

The file system 110 may manage logical addresses in units of sections. One section may include a plurality of segments. In an embodiment, a section in the file system 110 may correspond to a memory block of the memory device in the data storage device 200. A segment in the file system 110 may correspond to a page or a mapping unit of the memory device, the page including a plurality of mapping units. The page may be an execution unit of operations such as a read operation and a write operation, and the mapping unit may be defined by the size of data corresponding to one logical address. Therefore, in the file system 110, one segment may correspond to one logical address or two or more logical addresses.

The host memory may temporarily store data to be written in the memory device of the data storage device 200 or data read from the memory device. Furthermore, the host memory may be used as a working memory for driving the application, the file system 110, and the like.

The data storage device 200 may store data that is accessed by the host 100. The data storage device 200 may be called a memory system.

The data storage device 200 may be fabricated as any one of various types of storage devices according to an interface protocol for communicating with the host 100. For example, the data storage device 200 may be configured as any one of various types of storage devices including a solid state drive (SSD), a multimedia card (e.g., an MMC, an eMMC, an RS-MMC, or a micro-MMC), a secure digital card (e.g., an SD, a mini-SD, or a micro-SD), a universal serial bus (USB) storage device, a universal flash storage (UFS) device, a personal computer memory card international association (PCMCIA) card, a peripheral component interconnection (PCI) card, a PCI express (PCI-E) card, a compact flash (CF) card, a smart media card, a memory stick, and the like.

The data storage device 200 may be fabricated using any one of various types of packages, such as a package on package (POP), a system in package (SIP), a system on chip (SOC), a multi-chip package (MCP), a chip on board (COB), a wafer-level fabricated package (WFP), a wafer-level stack package (WSP), or the like.

Figure 2:
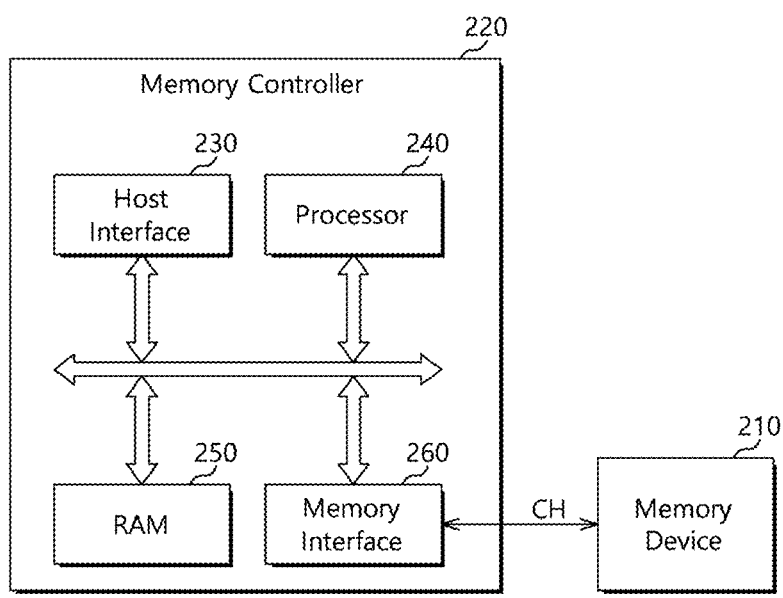
FIG. 2 and FIG. 3 illustrate a data storage device in accordance with an embodiment.
Figure 3:
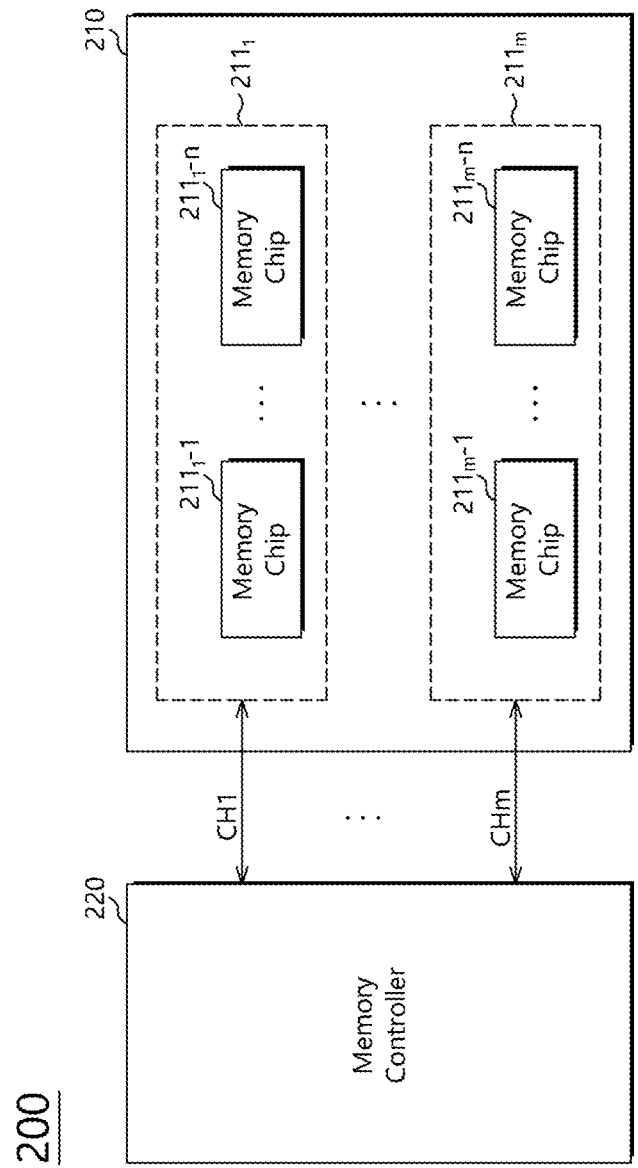

FIG. 2 and FIG. 3 illustrate the data storage device 200 of FIG. 1 in accordance with an embodiment.

Referring to FIG. 2 and FIG. 3, the data storage device 200 may include a memory device 210 and a memory controller 220.

The memory device 210 may operate as a storage medium of the data storage device 200. The memory device 210 may include any one of various types of nonvolatile memory devices, such as a NAND flash memory device, a NOR flash memory device, a ferroelectric random access memory (FRAM) device using a ferroelectric capacitor, a magnetic random access memory (MRAM) device using a tunneling magneto-resistive (TMR) film, a phase change random access memory (PRAM) device using chalcogenide alloys, a resistive random access memory (ReRAM) device using a transition metal oxide, or the like.

The memory device 210 may include a memory cell array (not illustrated) having a plurality of memory cells arranged at intersections of a plurality of bit lines (not illustrated) and a plurality of word lines (not illustrated).

For example, each memory cell of the memory cell array may be a single level cell (SLC) capable of storing one bit of data, a multi-level cell (MLC) capable of storing two bits of data, a triple level cell (TLC) capable of storing three bits of data, or a quad level cell (QLC) capable of storing four bits of data. The memory cell array may include at least one of the single level cell, the multi-level cell, the triple level cell, and the quad level cell. In addition, the memory cell array may include memory cells having a two-dimensional horizontal structure or memory cells having a three-dimensional vertical structure.

The memory controller 220 may control the overall operation of the data storage device 200 by executing firmware or software loaded on a random access memory (RAM) 250. The memory controller 220 may decode and execute a code type instruction or an algorithm such as firmware or software. The memory controller 220 may be implemented as hardware or a combination of hardware and software.

The memory controller 220 may include a host interface 230, a processor 240, the RAM 250, and a memory interface 260. Although not illustrated in FIG. 2, the memory controller 220 may further include an error correction code (ECC) circuit that generates parity data by ECC-encoding write data provided from the host 100 of FIG. 1 and ECC-decodes read data read from the memory device 210 by using parity data corresponding to the read data.

The host interface 230 may serve as an interface between the host 100 and the data storage device 200 in correspondence to the protocol of the host 100. For example, the host interface 230 may communicate with the host 100 using any one of protocols such as a universal serial bus (USB) interface, a universal flash storage (UFS) interface, a multimedia card (MMC) interface, a parallel advanced technology attachment (PATA) interface, a serial advanced technology attachment (SATA) interface, a small computer system interface (SCSI), a serial attached SCSI (SAS), a peripheral component interconnection (PCI) interface, and a PCI express (PCI-E) interface.

The processor 240 may be composed of a micro control unit (MCU) and/or a central processing unit (CPU). The processor 240 may process requests transmitted from the host 100. In order to process the requests transmitted from the host 100, the processor 240 may execute the code type instruction or algorithm loaded on the RAM 250, that is, the firmware, and control internal function blocks of the memory controller 220, such as the host interface 230, the RAM 250, and the memory interface 260, and the memory device 210.

The processor 240 may generate control signals for controlling an operation of the memory device 210 in response to a command transmitted from the host 100, and provide the generated control signals to the memory device 210 through the memory interface 260.

The RAM 250 may be composed of a dynamic random access memory (DRAM), a static random access memory (SRAM), or both. The RAM 250 may store the firmware that is executed by the processor 240. Furthermore, the RAM 250 may store data required for executing the firmware, for example, meta data. That is, the RAM 250 may operate as a working memory of the processor 240.

The RAM 250 may include a data buffer (not illustrated) for temporarily storing write data to be transmitted from the host 100 to the memory device 210, or read data to be transmitted from the memory device 210 to the host 100. That is, the RAM 250 may operate as a buffer memory.

The memory interface 260 may control the memory device 210 under the control of the processor 240. The memory interface 260 may provide the control signals generated by the processor 240 to the memory device 210. The control signals may include a command, an address, an operation control signal, and the like for controlling the memory device 210. The memory interface 260 may provide the memory device 210 with write data, or may receive read data from the memory device 210.

Referring to FIG. 3, the memory device 210 may include a plurality of memory chips 211. The plurality of memory chips 211 may be grouped into a plurality of memory chip groups $211_1$ to $211_m$, m being a natural number. Each of the plurality of memory chip groups $211_1$ to $211_m$ may include n memory chips, n being a natural number. The plurality of memory chip groups $211_1$ to $211_m$ may communicate with the memory controller 220 through corresponding channels CH1 to CHm.

For example, a plurality of memory chips $211_1$-1 to $211_1$-n to a plurality of memory chips $211_m$-1 to $211_m$-n respectively included in the memory chip groups $211_1$ to $211_m$ may be electrically connected to the channels CH1 to CHm, respectively. Each of the channels CH1 to CHm may refer to an independent bus capable of transmitting/receiving commands, addresses, and data between the memory controller 220 and a corresponding one of the memory chip groups $211_1$ to $211_m$. Memory chips electrically connected to different channels may independently operate.

Figure 4:
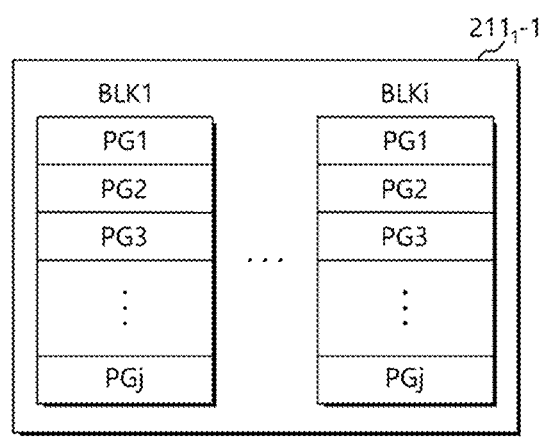
FIG. 4 illustrates an internal structure of a memory chip.

FIG. 4 illustrating an internal structure of a memory chip. Although FIG. 4 illustrates the first memory chip $211_1$-1 of the first memory chip group $211_1$ illustrated in FIG. 3 as an example, internal structures of the other memory chips included in the memory device 210 illustrated in FIG. 3 may be substantially the same as that illustrated in FIG. 4.

As illustrated in FIG. 4, the first memory chip $211_1$-1 may include a plurality of memory blocks BLK1 to BLKi, i being a natural number. Each of the memory blocks BLK1 to BLKi may include a plurality of pages PG1 to PGj, j being a natural number. Although not illustrated in FIG. 4, the first memory chip $211_1$-1 may include a plurality of planes, each of which may include a plurality of memory blocks.

FIG. 5 illustrates a logical address structure managed by a file system in accordance with an embodiment. The file system of FIG. 5 may correspond to the file system 110 shown in FIG. 1.

As illustrated in FIG. 5, the file system 110 may manage a plurality of logical addresses LBA1 to LBAz by grouping them into a predetermined number. In the present embodiment, for convenience of description, a group including a predetermined number of logical addresses will be referred to as a 'section.' That is, in the present embodiment, a 'section' may refer to a 'logical address group.'

For example, the file system 110 may manage the plurality of logical addresses LBA1 to LBAz by grouping them into p sections Section 1 to Section p, p being a natural number. Each of the sections Section 1 to Section p may include q segments SG1 to SGq, q being a natural number.

FIG. 5 illustrates that each of the sections Section 1 to Section p includes the same number of segments. However, embodiments are not limited thereto. In another embodiment, the number of segments included in each of the sections Section 1 to Section p may be different. For convenience of description, in the present embodiment, it is assumed that the number of segments included in each of the sections Section 1 to Section p is the same.

In an embodiment, the segments SG1 to SGq included in one section may correspond to the pages PG1 to PGj included in one memory block BLK illustrated in FIG. 4. In such a case, q may be substantially the same as j, and one segment may include two or more logical addresses.

In another embodiment, each of the segments SG1 to SGq included in one section may correspond to one mapping unit included in each of the pages PG1 to PGj. In such a case, q may be larger than j, and one segment may correspond to one logical address. Hereinafter, for convenience of description, it is assumed that one segment corresponds to one logical address.

The file system 110 may sequentially allocate logical addresses for write data to be stored in the memory device 210. For example, referring to FIG. 5, the file system 110 may sequentially allocate the logical addresses from the first logical address LBA1 corresponding to the first segment SG1 in the first section Section 1. In such a case, when data (hereinafter, referred to as 'old data') corresponding to a previously allocated logical address is changed or updated, the file system 110 may invalidate the logical address corresponding to the old data and allocate a first one of unallocated logical addresses as a logical address for the changed or updated data (hereinafter, referred to as 'new data').

Accordingly, the continuity of logical addresses corresponding to consecutive physical addresses of a memory device is not broken, so that the performance of a data storage device including the memory device, for example, read performance, can be improved.

Figure 6A:
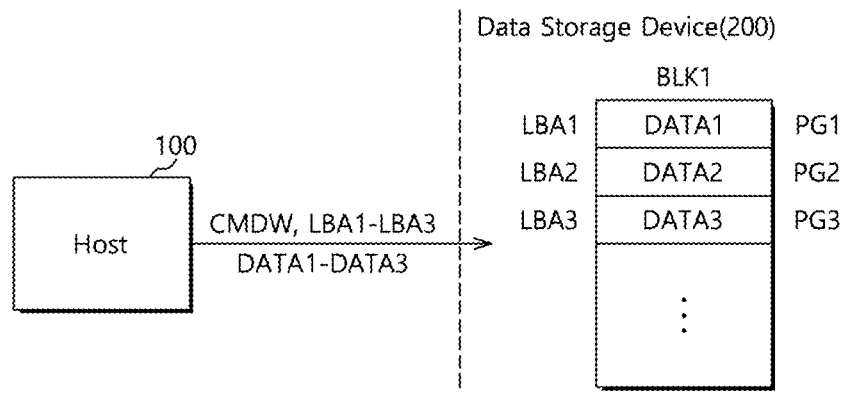
FIGS. 6A and 6B illustrate a write operation for maintaining the continuity of logical addresses in accordance with an embodiment.
Figure 6B:
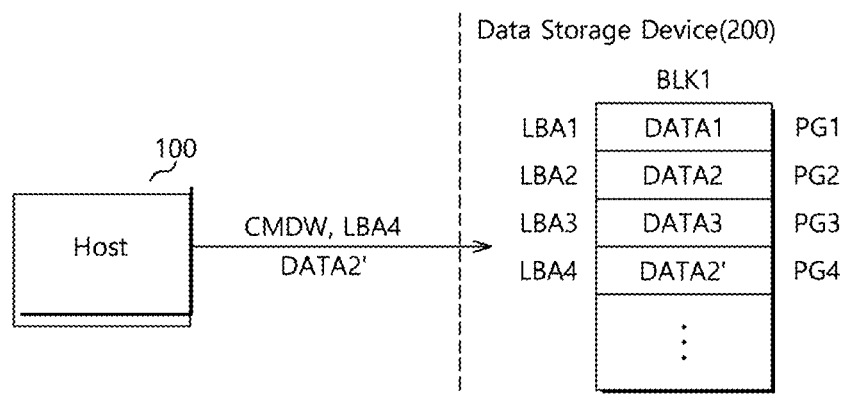
Figure 6C:
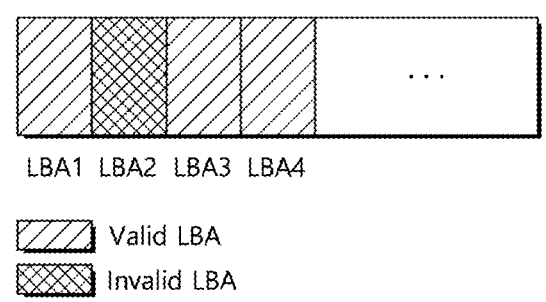
FIG. 6C illustrates a logical address structure in which a logical address corresponding to old data is invalidated.

FIGS. 6A and 6B illustrate a write operation for maintaining the continuity of logical addresses in accordance with an embodiment, and FIG. 6C illustrates an example in which a logical address corresponding to old data is invalidated in a logical address structure. FIGS. 6A to 6C will be described with reference to FIG. 1.

Referring to FIG. 6A, the host 100 may transmit a write command CMDW, write logical addresses LBA1 to LBA3, and write data DATA1 to DATA3 to the data storage device 200. The data storage device 200 may sequentially store the write data DATA1 to DATA3 in empty pages of a first memory block BLK1, which is an open memory block, in response to the write command CMDW received from the host 100. For example, the data storage device 200 may sequentially store the write data DATA1 to DATA3 in a first page PG1 to a third page PG3 of the first memory block BLK1.

For convenience of description, FIG. 6A illustrates that the write data DATA1 to DATA3 are sequentially stored from the first page PG1 located at the top of the first memory block BLK1. However, a data storage order is not particularly limited thereto. In another example, the write data DATA1 to DATA3 may be sequentially stored from a page located at the bottom of the first memory block BLK1.

Referring to FIG. 6B, after storing the write data DATA1 to DATA3 in the first memory block BLK1, the host 100 may transmit another write command CMDW, a write logical address LBA4, and write data DATA2' to the data storage device 200. The write data DATA2' may be data to change or update the write data DATA2 that is stored in the first memory block BLK1. That is, the write data DATA2 may be old data and the write data DATA2' may be new data. The data storage device 200 may store the write data DATA2' in the fourth page PG4, which is a first empty page following the third page PG3 that is the last page among the pages PG1 to PG3 storing data, in response to the other write command CMDW received from the host 100.

As described above, the file system 110 of the host 100 does not re-allocate the logical address LBA2 allocated to the write data DATA2 (old data) during a write operation for storing the write data DATA2' (new data), and instead allocates the fourth logical address LBA4 that is the first one of unallocated logical addresses. Accordingly, it is possible to maintain the continuity of the logical addresses mapped to the consecutive first to fourth pages PG1 to PG4 of the first memory block BLK1.

Furthermore, as illustrated in FIG. 6C, the file system 110 may invalidate the logical address LBA2 allocated to the write data DATA2 (old data) in a first section Section 1 of the logical address structure. As described above, the file system 110 invalidates logical addresses associated with old data in the logical address structure, so that the logical address structure may include a mixture of invalid logical addresses and valid logical addresses.

In order to allow the invalid logical addresses to be in an allocatable state, for example, in a 'free state,' the file system 110 may perform an address garbage collection (AGC) operation on the logical address structure including both invalid logical addresses and valid logical addresses. For example, the file system 110 may perform the address garbage collection (AGC) operation to select a victim section in the logical address structure, to move valid logical addresses included in the selected victim section to another section including unallocated (or free) logical addresses, and then to allow all logical addresses included in the victim section to be in the free state. In the present embodiment, the 'free state' may refer to both an unallocated state and an allocatable state. Similarly, a 'free logical address' may refer to both an unallocated logical address and an allocatable logical address.

The file system 110 may perform the address garbage collection (AGC) operation as described above. However, embodiments are not limited thereto. For convenience of description, two address garbage collection (AGC) schemes will be described hereinafter. The two address garbage collection (AGC) schemes may include a background address garbage collection (BAGC) operation and a foreground address garbage collection (FAGC) operation.

FIG. 7 illustrates the BAGC operation. For convenience of description, it is assumed that each section included in a logical address structure includes 10 logical addresses. Furthermore, although FIG. 7 illustrates that two logical addresses LBA3 and LBA8 are invalid logical addresses, this is for convenience of description. In a section on which the BAGC operation is to be performed, the number of invalid logical addresses may be greater than that of valid logical addresses. The BAGC operation illustrated in FIG. 7 will be described with reference to FIGS. 1 and 2.

Referring to FIG. 7, in the first section Section 1, logical addresses LBA3 and LBA8 are invalid logical addresses and logical addresses LBA1 and LBA2, LBA4 to LBA7, and LBA9 and LBA10 are valid logical addresses. The file system 110 may select the first section Section 1 as a victim section and perform the BAGC operation on the first section Section 1. The file system 110 may move the eight valid logical addresses, except for the invalid logical addresses LBA3 and LBA8, to the second section Section 2 including free logical addresses, and allow all the logical addresses LBA1 to LBA10 included in the first section Section 1 to be in a free state.

Then, the file system 110 may transmit an unmap command Unmap CMD for the logical addresses LBA1 to LBA10 of the first section Section 1 to the data storage device 200. Although not illustrated in FIG. 7, the data storage device 200 may perform an unmap operation (or unmapping operation) on the logical addresses LBA1 to LBA10 in response to the received unmap command Unmap CMD.

As described above, the BAGC operation requires a very long operation time for moving valid logical addresses in a victim section to an empty section and allowing the logical addresses in the victim section to be in the free state. Therefore, the BAGC operation may be appropriately performed in the background to substantially prevent performance degradation in the electronic device 10. Accordingly, this type of address garbage collection (AGC) operation is called the BAGC operation.

Meanwhile, when there are no free logical addresses in the logical address structure or there is no enough time to perform the BAGC operation, the file system 110 may sequentially re-allocate invalid logical addresses. In the present embodiment, such a scheme is called the FAGC operation.

As described above, in the present embodiment, the file system 110 sequentially allocates logical addresses. For example, after the last logical address LBAz in the logical address structure illustrated in FIG. 5 is allocated, the logical addresses in the logical address structure may be sequentially re-allocated from the first logical address LBA1. In such a case, when an invalid logical address is re-allocated, the continuity of logical addresses mapped to consecutive physical addresses of a memory block may be broken, so that read performance may be degraded.

In the present embodiment, the host 100 may transmit a write command to the data storage device 200, wherein the write command includes information for distinguishing a write operation to which a free logical address has been allocated (hereinafter, referred to as a 'normal write operation') from a write operation to which an invalid logical address has been allocated (hereinafter, referred to as a 'rare write operation'). A specific bit of the write command may be used to provide the information for distinguishing the normal write operation from the rare write operation. Therefore, a value of the specific bit of the write command may correspond to the information. However, embodiments are not limited thereto.

In an embodiment, the host 100 sets the specific bit of the write command to a reset state (for example, a first value) or a set state (for example, a second value) in order to respectively indicate that a write operation is the normal write operation or the rare write operation. The first value may be '0' and the second value may be '1.' However, embodiments are not limited thereto.

For example, the host 100 may transmit a normal write command, in which the specific bit has been set to the 'reset state' indicating the normal write operation, to the data storage device 200, and transmit a rare write command, in which the specific bit has been set to the 'set state' indicating the rare write operation, to the data storage device 200.

The controller 220 of the data storage device 200 may allocate a normal open memory block OBLK_N (hereinafter, referred to as a 'normal open block') for storing write data in response to the normal write command and allocate a rare open memory block OBLK_R (hereinafter, referred to as a 'rare open block') for storing write data in response to the rare write command, among a plurality of memory blocks included in the memory device 210.

Furthermore, the controller 220 may separately manage a physical address to logical address (P2L) table corresponding to the normal open block OBLK_N and a P2L table corresponding to the rare open block OBLK_R. The P2L table corresponding to the normal open block OBLK_N may be referred to as a 'normal P2L table,' and the P2L table corresponding to the rare open block OBLK_R may be referred to as a 'rare P2L table.'

Figure 8A:
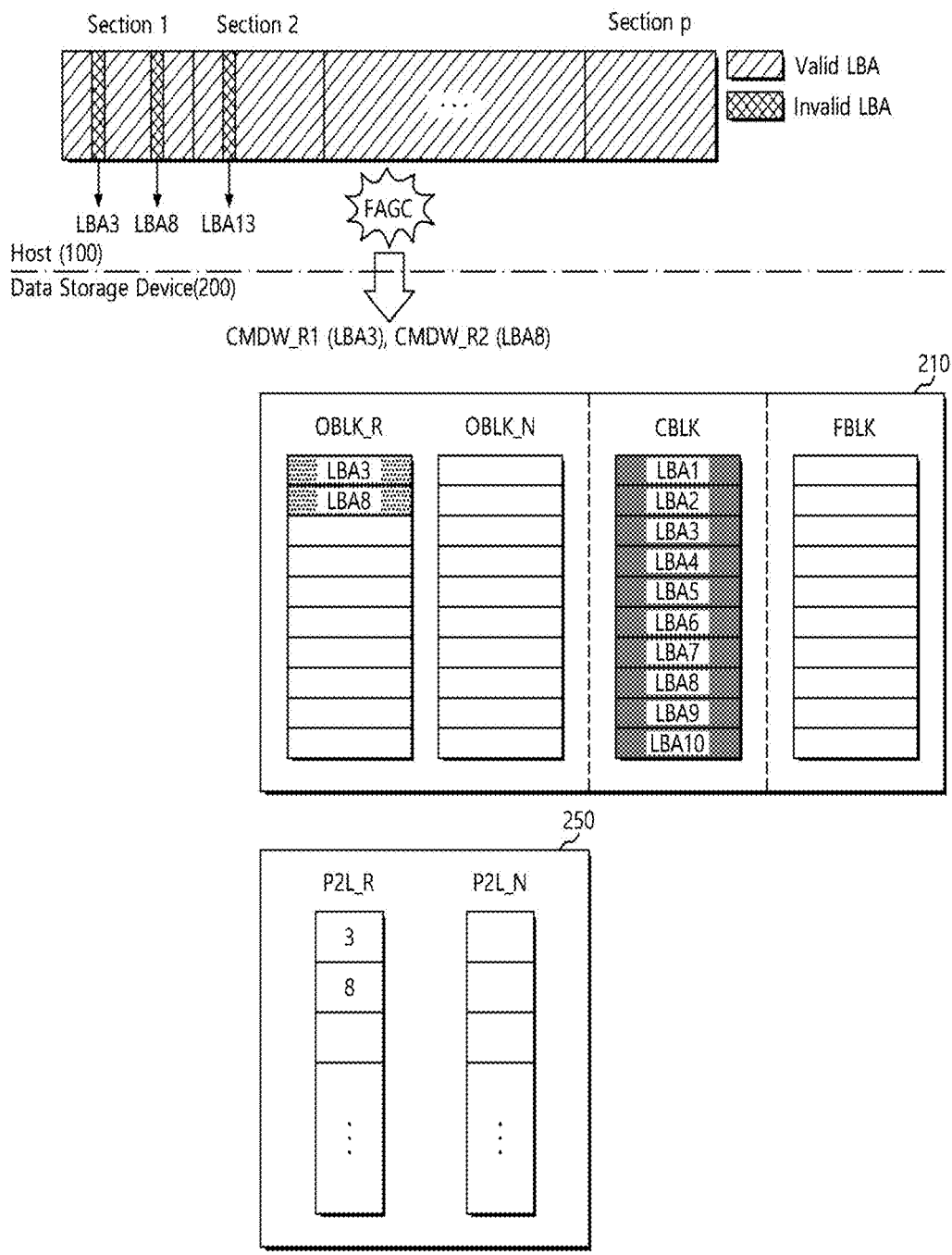
FIGS. 8A and 8B illustrate a foreground address garbage collection operation.
Figure 8B:
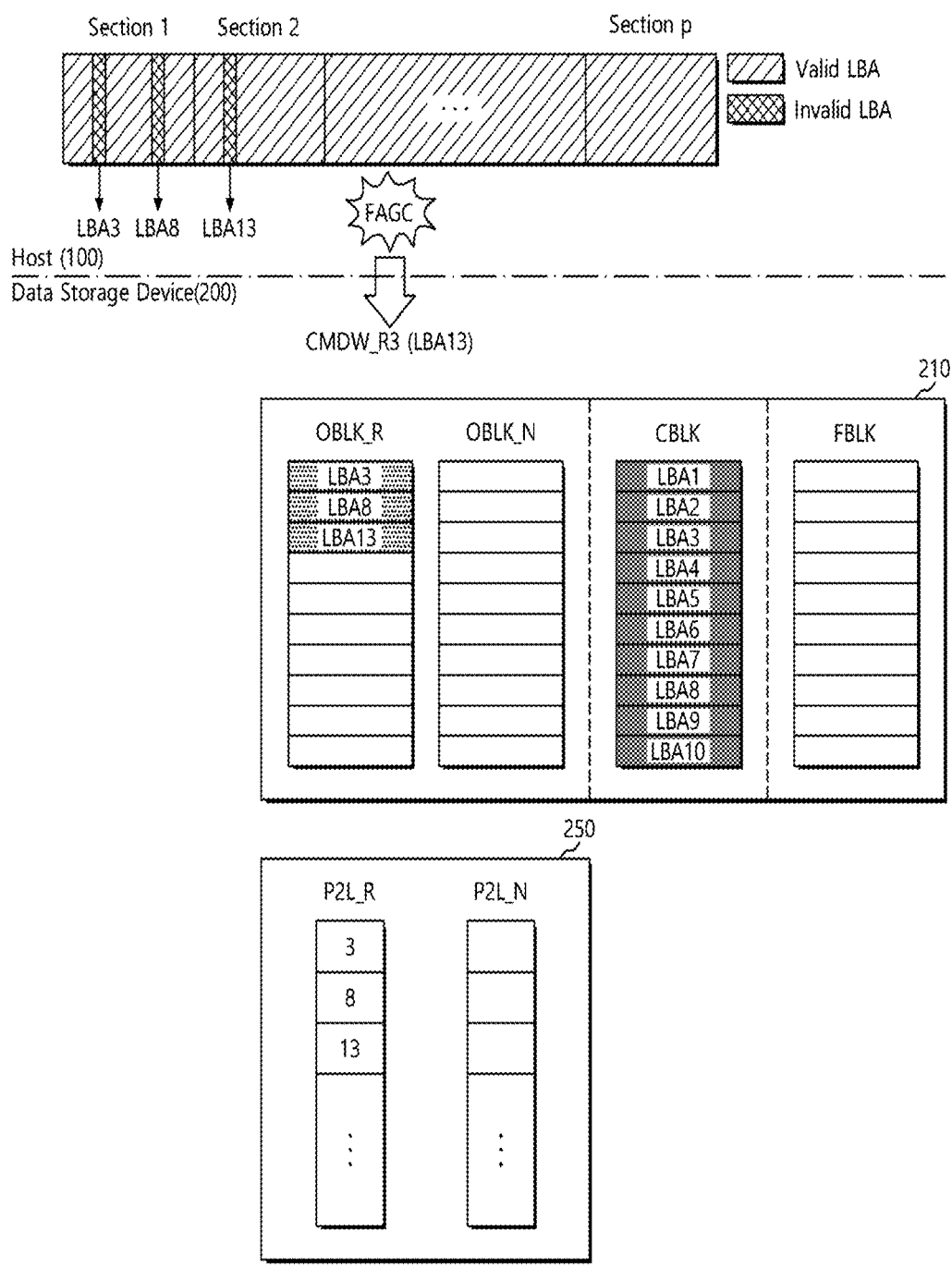

FIGS. 8A and 8B illustrate the FAGC operation. For convenience of description, it is assumed that each section included in a logical address structure includes 10 logical addresses, that logical addresses LBA3 and LBA8 of a first section Section 1 and a logical address LBA13 of a second section Section 2 are invalid logical addresses, that logical addresses other than the logical addresses LBA3, LBA8, and LBA13 are valid logical addresses, and that there are no free logical addresses in the logical address structure. Furthermore, for convenience of description, it is assumed that one memory block stores data corresponding to the 10 logical addresses. The FAGC operation illustrated in FIGS. 8A and 8B will be described with reference to FIGS. 1 and 2.

Referring to FIG. 8A, since there are no free logical addresses that can be allocated in a writing operation, the host 100 may perform the FAGC operation to re-allocate invalid logical addresses. For example, the host 100 may re-allocate the invalid logical addresses LBA3 and LBA8 of the first section Section 1 to write data, and transmit a first rare write command CMDW_R1 and a second rare write command CMDW_R2 to the data storage device 200. The first rare write command CMDW_R1 and the second rare write command CMDW_R2 respectively indicate the re-allocation of the invalid logical addresses LBA3 and LBA8. The re-allocated logical addresses LBA3 and LBA8 are used as valid logical addresses through the re-allocation.

The controller 220 of the data storage device 200 may control the memory device 210 to store write data corresponding to the re-allocated logical addresses LBA3 and LBA8 in the rare open block OBLK_R in response to the first and second rare write commands CMDW_R1 and CMDW_R2 received from the host 100. Furthermore, the controller 220 may store the re-allocated logical addresses LBA3 and LBA8 by mapping the re-allocated logical addresses LBA3 and LBA8 to corresponding positions of a rare P2L table P2L_R corresponding to the rare open block OBLK_R. As illustrated in FIG. 8A, the rare P2L table P2L_R corresponding to the rare open block OBLK_R and a normal P2L table P2L_N corresponding to the normal open block OBLK_N may be included in the RAM 250.

Referring to FIG. 8B, the host 100 may re-allocate the invalid logical address LBA13 of the second section Section 2 to write data and transmit a third rare write command CMDW_R3 to the data storage device 200. The third rare write command CMDW_R3 indicates the re-allocation of the invalid logical addresses LBA13. The re-allocated LBA13 is used as a valid logical address through the re-allocation.

The controller 220 may control the memory device 210 to store write data corresponding to the re-allocated logical address LBA13 in the rare open block OBLK_R in response to the third rare write command CMDW_R3 received from the host 100. Furthermore, the controller 220 may store the re-allocated logical address LBA13 by mapping the re-allocated logical address LBA13 to a corresponding position of the rare P2L table P2L_R corresponding to the rare open block OBLK_R.

As illustrated in FIG. 8B, in the logical address structure, the invalid logical address LBA13 is included in a section different from a section in which the invalid logical addresses LBA3 and LBA8 are included. For example, the invalid logical addresses LBA3 and LBA8 are included in the first section Section 1 and the invalid logical address LBA13 is included in the second section Section 2. That is, the invalid logical addresses LBA3 and LBA8 may be logical addresses mapped to a closed memory block CBLK illustrated in FIG. 8B, and the invalid logical address LBA13 may be a logical address mapped to another closed memory block CBLK not illustrated in FIG. 8B.

As described above, when a write operation is performed on invalid logical addresses mapped to different memory blocks, a map update (hereinafter, referred to as a 'rare map update') based on the rare P2L table P2L_R may be triggered. When the rare map update is triggered, the controller 220 may merge the write data corresponding to the re-allocated logical addresses LBA3 and LBA8 and stored in the rare open block OBLK_R and data corresponding to the logical addresses LBA1 to LBA10 and stored in the closed memory block CBLK, store the merged data in a free memory block FBLK, and then perform a map update to change physical addresses respectively mapped to the logical addresses LBA1 to LBA10 from physical addresses of the closed memory block CBLK to physical addresses of the free memory block FBLK in which the merged data is stored.

Figure 8C:
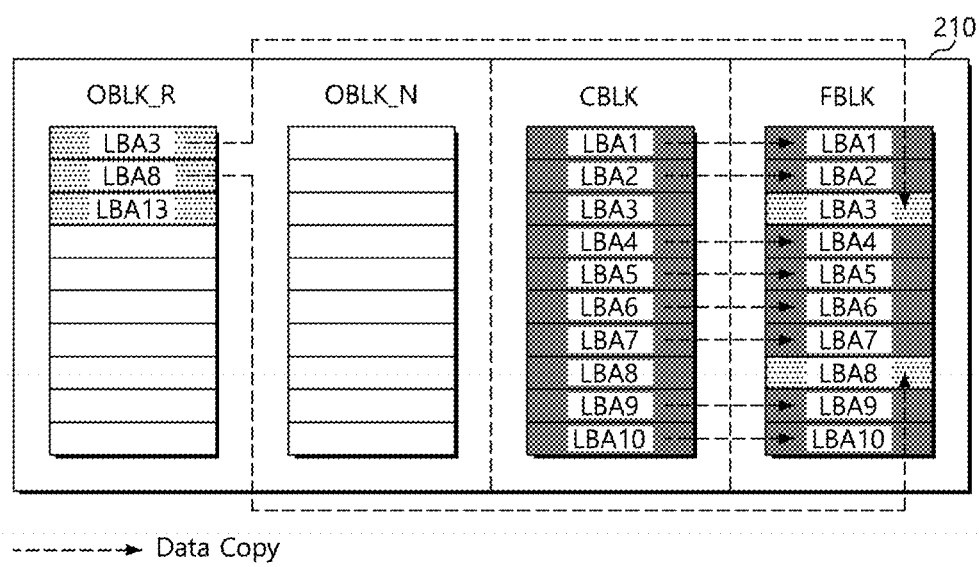
FIG. 8C illustrates a rare map update in accordance with an embodiment.

FIG. 8C illustrates the rare map update in accordance with an embodiment. In the rare map update, first data corresponding to re-allocated logical addresses and stored in the rare open block OBLK_R and second data stored in the closed memory block CBLK that is associated with the re-allocated logical addresses are merged and stored in the free memory block FBLK.

Referring to FIG. 8C, the controller 220 may move the second data, which is stored in physical positions (or physical addresses) mapped to the logical addresses LBA1 and LBA2, LBA4 to LBA7, and LBA9 and LBA10 in the closed memory block CBLK, to corresponding physical positions in the free memory block FBLK, and move the first data, which is stored in physical positions (or physical addresses) mapped to the re-allocated logical addresses LBA3 and LBA8 in the rare open block OBLK_R, to corresponding physical positions in the free block FBLK.

That is, the second data stored in the closed memory block CBLK and the first data stored in the rare open block OBLK_R, which correspond to the logical addresses LBA1 and LBA2, LBA4 to LBA7, and LBA9 and LBA10 and the re-allocated logical addresses LBA3 and LBA8, are sequentially stored in the free memory block FBLK according to the order of LBA1 to LBA10. Accordingly, the continuity of logical addresses mapped to consecutive pages of the free memory block FBLK can be maintained.

In an embodiment, the controller 220 may read the second data corresponding to the logical addresses LBA1 and LBA2, LBA4 to LBA7, and LBA9 and LBA10 from the closed memory block CBLK, detect and correct an error included in the read data by performing error correction code (ECC) decoding on the read data, and store the error-corrected data in the free memory block FBLK. Similarly, the controller 220 may read the first data corresponding to the re-allocated logical addresses LBA3 and LBA8 from the rare open block OBLK_R, detect and correct an error included in the read data by performing error correction code (ECC) decoding on the read data, and store the error-corrected data in the free memory block FBLK.

When the storing of the first and second data corresponding to the logical addresses LBA1 to LBA10 in the free memory block FBLK is completed, the free memory block FBLK becomes a new closed memory block for the logical addresses LBA1 to LBA10. Accordingly, a map update may be performed to map the logical addresses LBA1 to LBA10 to the physical addresses of the free memory block FBLK that is now the closed memory block.

Furthermore, whenever a new closed memory block is generated, the controller 220 may store a logical address corresponding to data finally stored in the new closed memory block by matching the logical address with information (for example, an index) indicating the new closed memory block. The logical address corresponding to the finally stored data may be referred to as a 'last allocated logical address.' The last allocated logical address for each closed memory block may be stored in the RAM 250. However, embodiments are not limited thereto.

Whenever a current rare write command is received from the host 100, the controller 220 may determine whether a closed memory block to which an invalid logical address corresponding to the current rare write command has been mapped is different from a closed memory block to which an invalid logical address corresponding to a previous rare write command has been mapped by referring to the last allocated logical address for each closed memory block that is stored in the RAM 250, the current rare write command following the previous rare write command.

The rare map update described above may be performed whenever closed memory blocks to which re-allocated logical addresses corresponding to current and previous rare write commands have been mapped are different from each other, and may be performed separately from a normal map update for the normal open block OBLK_N. The normal map update may be performed when the normal P2L table P2L_N for the normal open block OBLK_N is full or the size of data stored in the normal open block OBLK_N exceeds a threshold value. However, embodiments are not limited thereto.

In the present embodiment, an access priority of the rare P2L table P2L_R corresponding to the rare open block OBLK_R may be higher than that of the normal P2L table P2L_N corresponding to the normal open block OBLK_N. For example, when a read command and a read logical address are received from the host 100, the controller 220 may search for the read logical address in the rare P2L table P2L_R, and then search for the read logical address in the normal P2L table P2L_N when the read logical address does not exist in the rare P2L table P2L_R.

Accordingly, when sudden power off (SPO) occurs, the controller 220 may restore the rare P2L table P2L_R and then restore the normal P2L table P2L_N. Since the normal open block OBLK_N stores data for consecutive logical addresses, the normal P2L table P2L_N may be restored in a short time by using an incremental memset scheme after checking a start logical address mapped to a start position of the normal open block OBLK_N and the last storage position of the normal open block OBLK_N.

Furthermore, when an unmap command is received from the host 100, the controller 220 may determine whether a logical address corresponding to the received unmap command exists in the rare P2L table P2L_R. When the logical address corresponding to the unmap command exists in the rare P2L table P2L_R, the controller 220 may reflect trim information on the logical address in the rare P2L table P2L_R.

Figure 9:
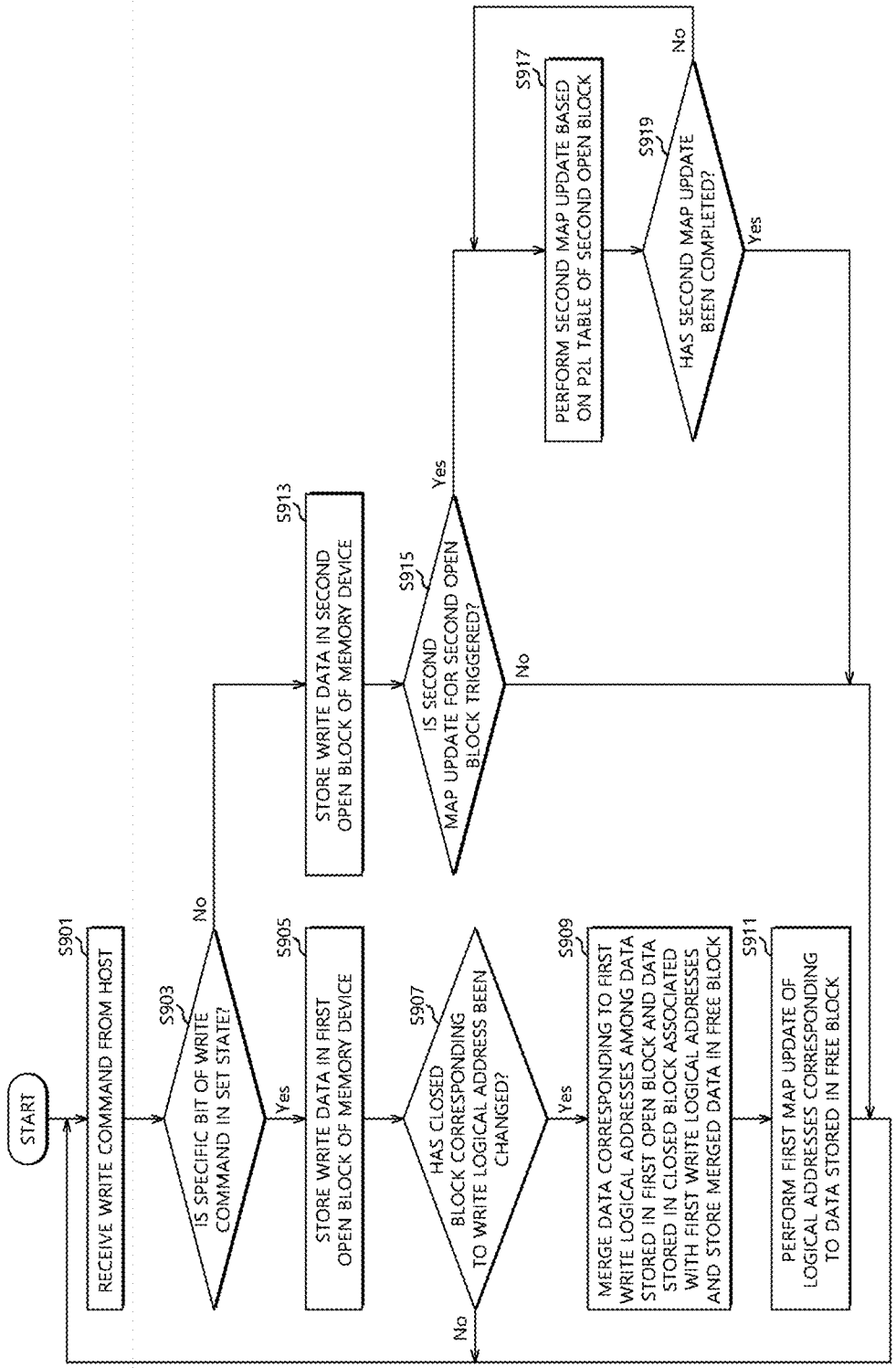
FIG. 9 is a flowchart illustrating a method of operating a data storage device in accordance with an embodiment.

FIG. 9 is a flowchart illustrating a method of operating a data storage device in accordance with an embodiment. The method illustrated in FIG. 9 will be described with reference to at least one of FIG. 2 to FIG. 5, FIG. 6A to FIG. 6C, FIG. 7, and FIG. 8A to FIG. 8C.

In step S901, the data storage device 200 may receive a write command from the host 100. In such a case, a write logical address and write data may be received together with the write command.

In step S903, the controller 220 of the data storage device 200 may determine whether a specific bit of the write command received from the host 100 is in a 'set' state. For example, when the specific bit of the write command is in the 'set' state, the write command may be a rare write command indicating that an invalid logical address has been re-allocated. Furthermore, when the specific bit of the write command is in a 'reset' state, the write command may be a normal write command indicating that a free logical address has been allocated. As a result of the determination, when the specific bit of the write command received from the host 100 is in the 'set' state, the process may proceed to step S905. On the other hand, when the specific bit of the write command received from the host 100 is in the 'reset' state, the process may proceed to step S913.

In step S905, the controller 220 may control the memory device 210 to store the write data in a first open block (for example, a rare open block) of the memory device 210. Although not illustrated in FIG. 9, the controller 220 may store the write logical address received in step S901 in the rare P2L table P2L_R corresponding to the first open block included in the RAM 250. For example, the controller 220 may store the write logical address in the rare P2L table P2L_R to be mapped to an index (or a physical address) of the rare P2L table P2L_R that corresponds to a position of the first open block in which the write data is stored.

In step S907, the controller 220 may determine whether a rare map update is triggered. In particular, when the write command and the write logical address received in step S901 are referred to as a 'current write command' and a 'current write logical address,' respectively, the controller 220 may determine whether a closed memory block to which the current write logical address has been mapped is different from a closed memory block to which a previous write logical address has been mapped, the previous write logical address being provided just before the current write logical address.

As a result of the determination, when the closed memory block to which the current write logical address has been mapped is different from the closed memory block to which the previous write logical address has been mapped, the rare map update is triggered and the process may proceed to step S909. On the other hand, when the closed memory block to which the current write logical address has been mapped is the same as the closed memory block to which the previous write logical address has been mapped, the process may return to step S901.

In step S909, the controller 220 may perform the rare map update described above with reference to FIG. 8C. That is, the controller 220 may merge first data corresponding to one or more first write logical addresses among data stored in the first open block and second data stored in the closed memory block associated with the first write logical addresses, and store the merged data in a free memory block. The first write logical addresses may be write logical addresses received before the current write logical address and mapped to the closed memory block to which the previous write logical address has been mapped.

Specifically, as illustrated in FIG. 8C, the controller 220 may move the first data, which is stored in physical positions (or physical addresses) of the first open block that are mapped to the first write logical addresses, and the second data, which is stored in physical positions (or physical addresses) of the closed memory block that are mapped to the remaining write logical addresses except for the first write logical addresses in a logical address group associated with the closed memory block, to corresponding physical positions of the free memory block.

In step S911, the controller 220 may perform a first map update to change physical addresses mapped to the write logical addresses corresponding to the first and second data stored in the free memory block from the physical addresses of the closed memory block to physical addresses of the free memory block. Then, the process may proceed to step S901.

In step S913, the controller 220 may determine that the write command indicates a normal write operation because the specific bit of the write command is in the 'reset' state, and store the write data in a second open block (for example, a normal open block) of the memory device 210.

In step S915, the controller 220 may determine whether a second map update (for example, a normal map update) for the second open block is triggered. As a condition that the second map update is triggered, for example, whether a normal P2L table P2L_N corresponding to the second open block is full or whether the size of write data stored in the second open block exceeds a threshold value may be used. However, embodiments are not particularly limited thereto. When the second map update is triggered, the process may proceed to step S917. On the other hand, when the second map update is not triggered, the process may return to step S901.

In step S917, the controller 220 may perform the second map update based on the normal P2L table P2L_N corresponding to the second open block. For example, the controller 220 may perform the second map update by changing physical addresses for logical addresses corresponding to the data stored in the second open block into physical addresses of the second open block and storing the logical addresses, of which the physical addresses have been changed, in the memory device 210.

In step S919, the controller 220 may determine whether the second map update has been completed. As a result of the determination, when the second map update has been completed, the process may return to step S901. On the other hand, when the second map update has not been completed, the process may return to step S917.

Figure 10:
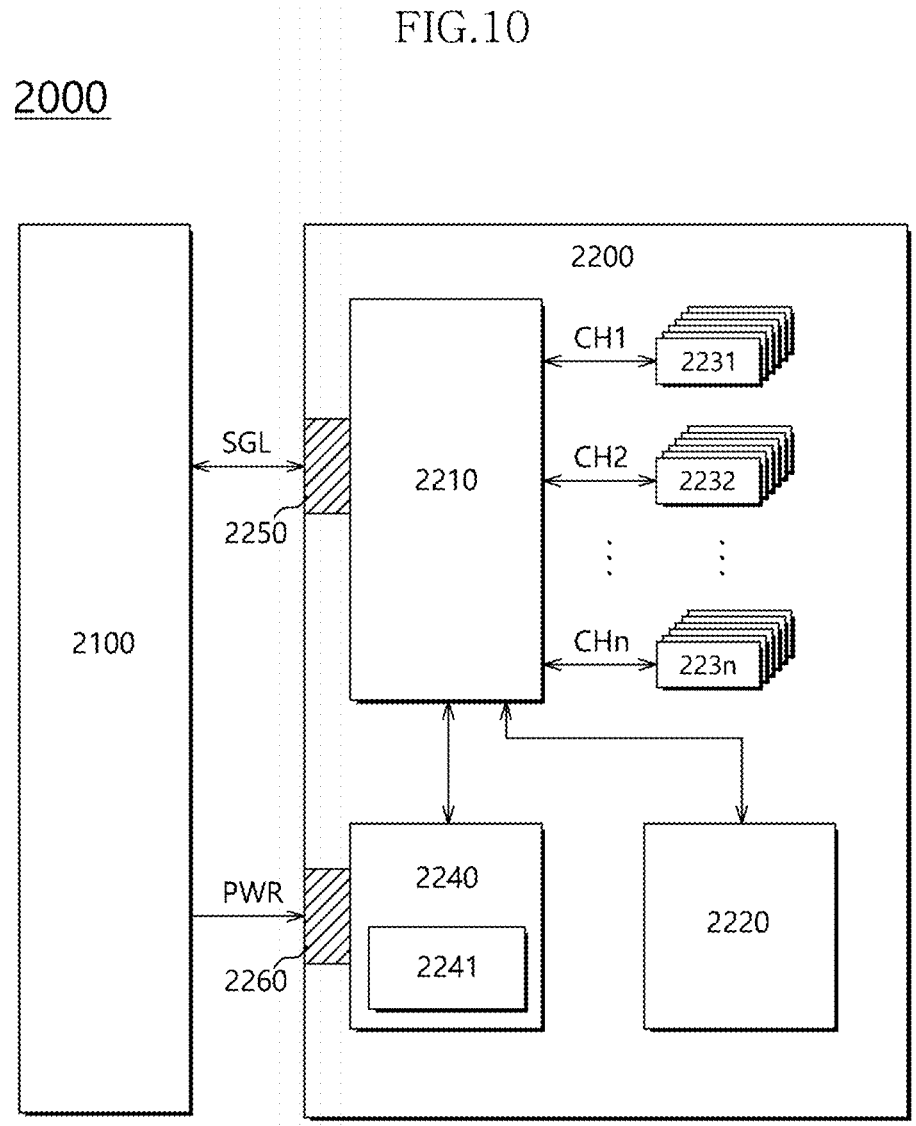
FIG. 10 illustrates a data processing system including a solid state drive (SSD) in accordance with an embodiment.

FIG. 10 illustrates a data processing system 2000 in accordance with an embodiment. Referring to FIG. 10, the data processing system 2000 may include a host 2100 and a solid state drive (SSD) 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the other components in the SSD 2200. The power supply 2240 may include an auxiliary power supply 2241. The auxiliary power supply 2241 may supply power so that the SSD 2200 is normally terminated even when sudden power-off (SPO) occurs. The auxiliary power supply 2241 may include large capacitors capable of charging the power PWR.

The controller 2210 may exchange a signal SGL with the host 2100 through the signal connector 2250. The signal SGL may include a command, an address, data, and the like. The signal connector 2250 may be configured of various types of connectors according to an interfacing method between the host 2100 and the SSD 2200.

Figure 11:
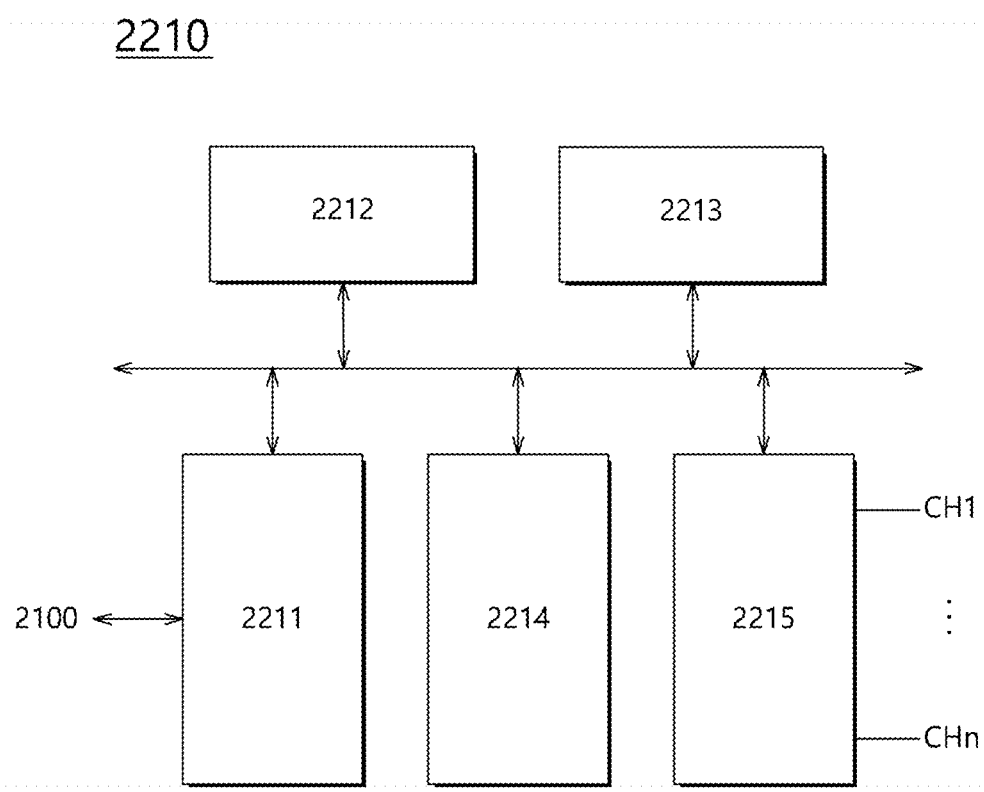
FIG. 11 illustrates a controller illustrated in FIG. 10.

FIG. 11 illustrates the controller 2210 of FIG. 10. Referring to FIG. 11, the controller 2210 may include a host interface unit 2211, a control unit 2212, a random access memory (RAM) 2213, an error correction code (ECC) unit 2214, and a memory interface unit 2215.

The host interface unit 2211 may perform interfacing between the host 2100 and the SSD 2200 according to a protocol of the host 2100. For example, the host interface unit 2211 may communicate with the host 2100 using any one of a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211 may perform a disc emulation function that the host 2100 recognizes the SSD 2200 as a general-purpose data storage device, for example, a hard disc drive HDD.

The control unit 2212 may analyze and process the signal SGL input from the host 2100. The control unit 2212 may control operations of internal functional blocks of the controller 2210 according to firmware and/or software for driving the SDD 2200. The RAM 2213 may act as a working memory for driving the firmware and/or software.

The ECC unit 2214 may generate parity data for write data to be transferred to the nonvolatile memory devices 2231 to 223n. The generated parity data may be stored in the nonvolatile memory devices 2231 to 223n together with the write data. The ECC unit 2214 may detect errors for data read from the nonvolatile memory devices 2231 to 223n. When detected errors are within a correctable range, the ECC unit 2214 may correct the detected errors using the parity data.

The memory interface unit 2215 may provide a control signal such as a command and an address to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide write data stored in the buffer memory device 2220 to the nonvolatile memory devices 2231 to 223n or provide data read from the nonvolatile memory devices 2231 to 223n to the buffer memory device 2220.

Figure 12:
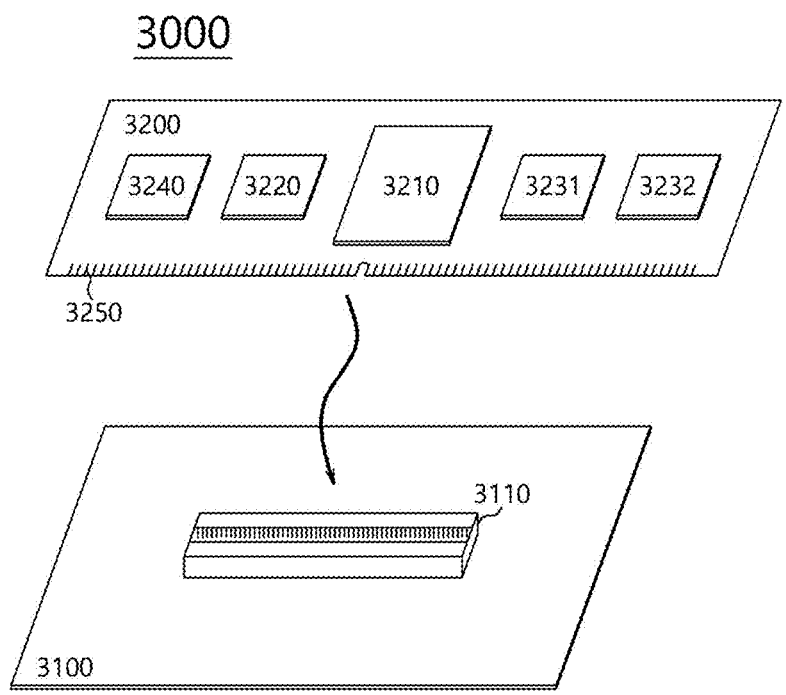
FIG. 12 illustrates a data processing system including a data storage device in accordance with an embodiment.

FIG. 12 illustrates a data processing system 3000 in accordance with an embodiment. Referring to FIG. 12, the data processing system 3000 may include a host 3100 and a data storage device 3200.

The host 3100 may be configured in a board form such as a printed circuit board (PCB). Although not shown in FIG. 12, the host 3100 may include internal functional blocks configured to perform functions of the host 3100.

The host 3100 may include a connection terminal 3110 such as a socket, a slot, or a connector. The data storage device 3200 may be mounted on the connection terminal 3110.

The data storage device 3200 may be configured in a board form such as a PCB. The data storage device 3200 may refer to a memory module or a memory card. The data storage device 3200 may include a controller 3210, a buffer memory device 3220, nonvolatile memory devices 3231 and 3232, a power management integrated circuit (PMIC) 3240, and a connection terminal 3250.

The controller 3210 may control an overall operation of the data storage device 3200. The controller 3210 may be configured to have the same configuration as the controller 2210 illustrated in FIG. 11.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host 3100 or the nonvolatile memory devices 3231 and 3232 according to control of the controller 3210.

The nonvolatile memory devices 3231 and 3232 may be used as a storage medium of the data storage device 3200.

The PMIC 3240 may provide power input through the connection terminal 3250 to the other components in the data storage device 3200. The PMIC 3240 may manage the power of the data storage device 3200 according to control of the controller 3210.

The connection terminal 3250 may be coupled to the connection terminal 3110 of the host 3100. Signals, such as a command, an address, and data, and power may be transmitted between the host 3100 and the data storage device 3200 through the connection terminal 3250. The connection terminal 3250 may be configured in any one of various forms according to an interfacing method between the host 3100 and the data storage device 3200. The connection terminal 3250 may be arranged in any one side of the data storage device 3200.

Figure 13:
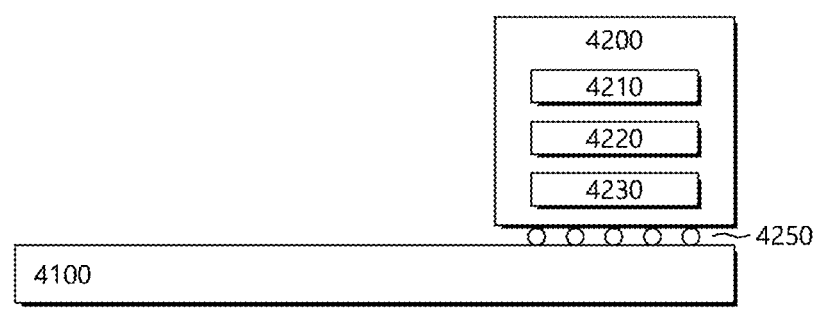
FIG. 13 illustrates a data processing system including a data storage device in accordance with an embodiment.

FIG. 13 illustrates a data processing system 4000 in accordance with an embodiment. Referring to FIG. 13, the data processing system 4000 may include a host 4100 and a data storage device 4200.

The host 4100 may be configured in a board form such as a PCB. Although not shown in FIG. 13, the host 4100 may include internal functional blocks configured to perform functions of the host 4100.

The data storage device 4200 may be configured in a surface mounting packaging form. The data storage device 4200 may be mounted on the host 4100 through a solder ball 4250. The data storage device 4200 may include a controller 4210, a buffer memory device 4220, and a nonvolatile memory device 4230.

The controller 4210 may control an overall operation of the data storage device 4200. The controller 4210 may be configured to have the same configuration as the controller 2210 illustrated in FIG. 11.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host 4100 or the nonvolatile memory device 4230 under the control of the controller 4210.

The nonvolatile memory device 4230 may be used as a storage medium of the data storage device 4200.

Figure 14:
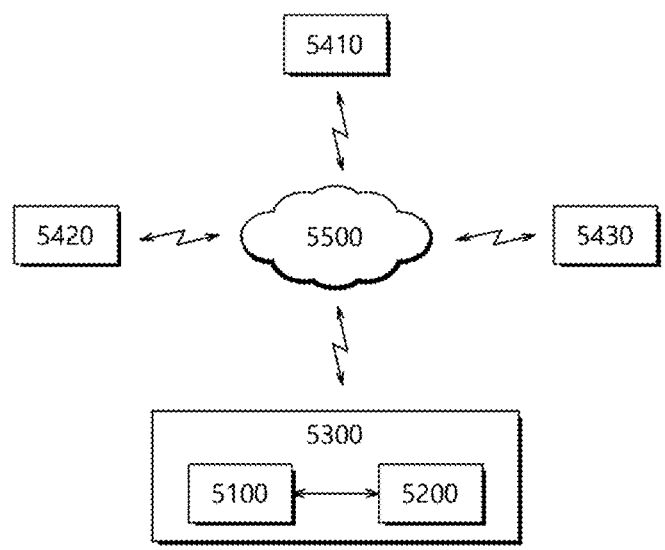
FIG. 14 illustrates a network system including a data storage device in accordance with an embodiment.

FIG. 14 illustrates a network system 5000 including a data storage device in accordance with an embodiment. Referring to FIG. 14, the network system 5000 may include a server system 5300 and a plurality of client systems 5410 to 5430 which are coupled to each other through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host 5100 and a data storage device 5200. The data storage device 5200 may be configured of the data storage device 200 of FIG. 1, the SSD 2200 of FIG. 10, the data storage device 3200 of FIG. 12, or the data storage device 4200 of FIG. 13.

Figure 15:
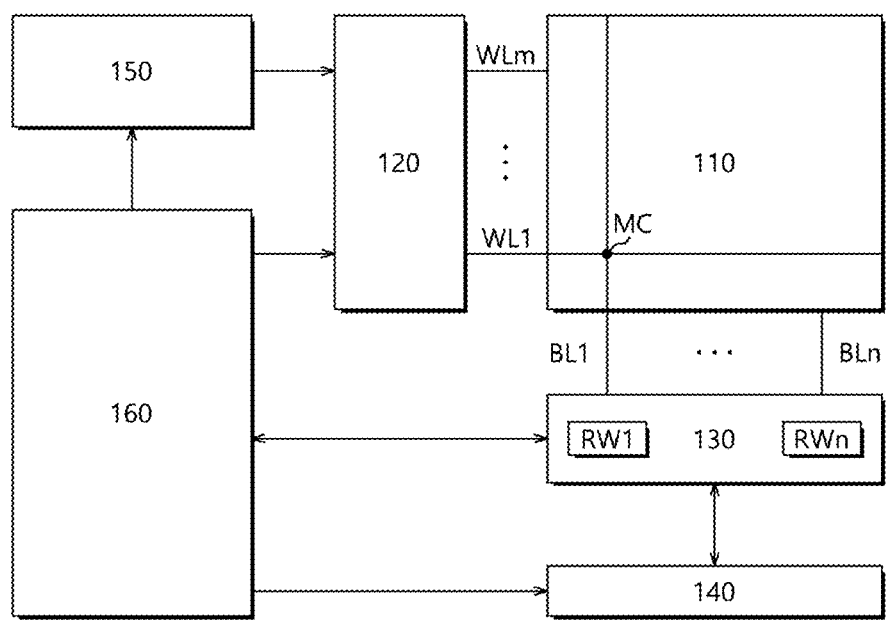
FIG. 15 illustrates a nonvolatile memory device included in a data storage device in accordance with an embodiment.

FIG. 15 illustrates a nonvolatile memory device 100 included in a data storage device in accordance with an embodiment. Referring to FIG. 15, the nonvolatile memory device 100 may include a memory cell array 110, a row decoder 120, a column decoder 140, a data read/write block 130, a voltage generator 150, and a control logic 160.

The memory cell array 110 may include memory cells MC arranged at intersections of word lines WL1 to WLm and bit lines BL1 to BLn.

The row decoder 120 may be coupled to the memory cell array 110 through the word lines WL1 to WLm. The row decoder 120 may operate under the control of the control logic 160. The row decoder 120 may decode an address provided by an external apparatus (not shown). The row decoder 120 may select and drive at least one of the word lines WL1 to WLm based on a decoding result. For example, the row decoder 120 may provide a word line voltage provided by the voltage generator 150 to the word lines WL1 to WLm.

The data read/write block 130 may be coupled to the memory cell array 110 through the bit lines BL1 to BLn. The data read/write block 130 may include read/write circuits RW1 to RWn respectively corresponding to the bit lines BL1 to BLn. The data read/write block 130 may operate under the control of the control logic 160. The data read/write block 130 may operate as a write driver or a sense amplifier according to an operation mode. For example, the data read/write block 130 may operate as the write driver configured to store data provided by an external apparatus in the memory cell array 110 in a write operation. In another example, the data read/write block 130 may operate as the sense amplifier configured to read data from the memory cell array 110 in a read operation.

The column decoder 140 may operate under the control of the control logic 160. The column decoder 140 may decode an address provided by an external apparatus (not shown). The column decoder 140 may couple the read/write circuits RW1 to RWn of the data read/write block 130 respectively corresponding to the bit lines BL1 to BLn with data input/output (I/O) lines (or data I/O buffers) based on a decoding result.

The voltage generator 150 may generate voltages used for an internal operation of the nonvolatile memory device 100. The voltages generated by the voltage generator 150 may be applied to the memory cells of the memory cell array 110. For example, a program voltage generated in a program operation may be applied to word lines coupled to memory cells in which the program operation is to be performed. In another example, an erase voltage generated in an erase operation may be applied to well regions of memory cells in which the erase operation is to be performed. In another example, a read voltage generated in a read operation may be applied to word lines coupled to memory cells in which the read operation is to be performed.

The control logic 160 may control an overall operation of the nonvolatile memory device 100 based on a control signal provided by an external apparatus. For example, the control logic 160 may control an operation of the nonvolatile memory device 100, such as a read operation, a write operation, and an erase operation.

While various embodiments have been described above, it will be understood to those skilled in the art that the embodiments described are examples only. Accordingly, the data storage device and the operating method thereof described herein should not be limited based on the described embodiments.

What is claimed is:

1. A data storage device, comprising:
a memory device including a first open block and a second open block; and
a controller configured to receive a write command, write data, and a write logical address from a host, wherein the write command includes information for distinguishing an address type to which a write operation is allocated,
wherein the information indicates whether the address type is an unallocated logical address type or an invalid logical address type, the unallocated logical address type indicates an address that has not yet been assigned to any data, and the invalid logical address type indicates an address generated by invalidating an old logical address assigned to old data before the old data is updated with new data,
wherein the controller determines whether to store the write data in the first open block or the second open block based on the information included in the write command, and controls the memory device to store the write data in the first open block or the second open block according to a result of the determination.

2. The data storage device according to claim 1, wherein the information corresponds to a value of a specific bit of the write command that is in a set state or a reset state.

3. The data storage device according to claim 2, wherein, when the specific bit of the write command is in the set state, the controller determines that the write logical address has the invalid logical address type.

4. The data storage device according to claim 3, wherein the controller determines whether a first closed block corresponding to a logical address for the latest data that is previously stored in the first open block is different from a second closed block corresponding to the write logical address for the write data that is currently stored in the first open block.

5. The data storage device according to claim 4, wherein, when the first closed block is different from the second closed block, the controller merges first data, which corresponds to one or more first logical addresses associated with the first closed block, among data stored in the first open block, and second data, which corresponds to the remaining logical addresses except for the first logical addresses among all logical addresses associated with the first closed block, among data stored in the first closed block, and controls the memory device to store the merged data in a free memory block of the memory device.

6. The data storage device according to claim 5, wherein the controller merges the first data of the first open block and the second data of the first closed block such that the first logical addresses and the remaining logical addresses are consecutively aligned.

7. The data storage device according to claim 6, wherein the controller performs a map update operation for mapping the first logical addresses and the remaining logical addresses that are consecutively aligned to physical addresses of the free memory block.

8. The data storage device according to claim 2, wherein, when the specific bit of the write command is in the reset state, the controller determines that the write logical address is the unallocated logical address.

9. An electronic device, comprising:
a host configured to transmit a write command, a write logical address, and write data to a data storage device, wherein the write command includes information for distinguishing an address type to which a write operation is allocated, wherein the information indicates whether the address type is an unallocated free logical address type or an invalid logical address type, the unallocated free logical address type indicates an address that has not yet been assigned to any data, and the invalid logical address type indicates an address generated by invalidating an old logical address assigned to old data before the old data is updated with new data; and
the data storage device configured to allocate a first open block to store the write data when the write logical address has the invalid logical address type, and allocate a second open block to store the write data when the write logical address has the unallocated free logical address type, among a plurality of memory blocks of the memory device, according to the information included in the write command received from the host.

10. The electronic device according to claim 9, wherein the information corresponds to a value of a specific bit of the write command that is in a set state or a reset state, and
when the invalid logical address type is used as the write logical address, the host sets the specific bit of the write command to the set state and transmits the write command to the data storage device.

11. The electronic device according to claim 10, wherein the data storage device determines whether a first closed block corresponding to a logical address for the latest data that is previously stored in the first open block is different from a second closed block corresponding to the invalid logical address, and when the first closed block is different from the second closed block, the data storage device merges first data, which corresponds to one or more first logical addresses associated with the first closed block among data stored in the first open block, and second data, which corresponds to the remaining logical addresses except for the one or more first logical addresses among all logical addresses associated with the first closed block, among data stored in the first closed block, and stores the merged data in a free memory block among the plurality of memory blocks of the memory device.

12. The electronic device according to claim 11, wherein the data storage device merges the first data of the first open block and the second data of the first closed block such that the first logical addresses and the remaining logical addresses are consecutively aligned, and the data storage device performs a map update operation for mapping the first logical addresses and the remaining logical addresses that are consecutively aligned to physical addresses of the free memory block.

13. The electronic device according to claim 9, wherein the host manages a logical address structure composed of a plurality of sections, each of which includes a plurality of logical addresses, selects a first section including one or more invalid logical addresses from the plurality of sections, selects a second section including unallocated free logical addresses from the plurality of sections, moves valid logical address included in the first section to the second section, and transmits an unmap command for the valid and invalid logical addresses included in the first section to the data storage device.

14. A method of operating a data storage device, the method comprising:

receiving a write command, write data, and a write logical address from a host;

allocating a first open block and a second open block;

determining whether to store the write data in the first open block or the second open block based on information included in the write command, wherein the information is for distinguishing an address type to which a write operation is allocated; and controlling the memory device to store the write data in the first open block or the second open block according to a result of the determination, wherein the information indicates whether the address type is an unallocated logical address type or an invalid logical address type, the unallocated logical address type indicates an address that has not yet been assigned to any data, and the invalid logical address type indicates an address generated by invalidating an old logical address assigned to old data before the old data is updated with new data.

15. The method according to claim 14, wherein the information corresponds to a value of a specific bit of the write command that is in a set state or a reset state, and wherein determining whether to store the write data in the first open block or the second open block comprises:

determining whether the specific bit is in the set state or the reset state; and determining that the write data is to be stored in the first open block when the specific bit is in the set state and that the write data is to be stored in the second open block when the specific bit is in the reset state.

16. The method according to claim 15, further comprising:

determining whether a first closed block corresponding to a logical address for the latest data that is previously stored in the first open block is different from a second closed block corresponding to a write logical address received together with the write command from the host when the specific bit is in the set state; and merging first data, which corresponds to one or more first logical addresses associated with the first closed block, among data stored in the first open block, and second data, which corresponds to the remaining logical addresses except for the one or more first logical addresses among all logical addresses associated with the first closed block, among data stored in the first closed block when the first closed block is different from the second closed block, and storing the merged data in a free memory block of the memory device.

17. The method according to claim 16, wherein merging the first data and the second data comprises:

merging the first data of the first open block and the second data of the first closed block such that the one or more first logical addresses and the remaining logical addresses are consecutively aligned.

18. The method according to claim 17, further comprising, after merging the first data and the second data and storing the merged data in the free memory block of the memory device:

performing a map update operation for mapping the first logical addresses and the remaining logical addresses that are consecutively aligned to physical addresses of the free memory block.

* * * * *